United States Patent [19]

Yokotani et al.

[11] Patent Number: 4,752,858
[45] Date of Patent: Jun. 21, 1988

[54] MULTI-LAYER CERAMIC CAPACITOR

[75] Inventors: Yoichiro Yokotani; Junichi Kato; Toshihiro Mihara, all of Osaka, Japan

[73] Assignee: Matsushita Electric Industrial Co., Ltd., Japan

[21] Appl. No.: 24,778

[22] Filed: Mar. 11, 1987

[30] Foreign Application Priority Data

Mar. 12, 1986 [JP] Japan ................................ 61-54053
Mar. 12, 1986 [JP] Japan ................................ 61-54056

[51] Int. Cl.⁴ ........................ H01B 3/12; H01G 4/10
[52] U.S. Cl. ........................ 361/321; 501/136
[58] Field of Search .......... 264/61; 361/320–322, 361/328–330; 252/62.3; 29/25.42; 501/134–138

[56] References Cited

U.S. PATENT DOCUMENTS

| | | | |
|---|---|---|---|
| 3,920,781 | 11/1975 | Eror et al. | 264/61 |
| 4,054,532 | 10/1977 | Hanke et al. | 361/320 X |
| 4,101,952 | 7/1978 | Burn | 361/320 X |
| 4,115,493 | 9/1978 | Sakabe et al. | 264/61 |
| 4,265,668 | 5/1981 | Fujiwara et al. | 501/136 X |
| 4,607,314 | 8/1986 | Wada et al. | 264/61 X |

*Primary Examiner*—Donald A. Griffin
*Attorney, Agent, or Firm*—Lowe, Price, LeBlanc, Becker & Shur

[57] ABSTRACT

Material forming dielectric ceramics includes an oxide containing a component A and a component B. The component A is selected from a group I of lead, calcium, strontium, and barium. The component B is selected from a group II of magnesium, nickel, titanium, zinc, niobium, and tungsten. The component A includes lead and at least one of the other substances in the group I. The component B includes at least two of the substances in the group II. A ratio between values a and b is chosen so that a/b>1.00, where the value a denotes a total mol value of the substances in the component A and the value b denotes a total mol value of the substances in the component B. Electrode layers are made of copper or an alloy principally containing copper. Since the firing temperature of the dielectric ceramics is low, excellent characteristics of a capacitor are enabled in spite of the fact that electrodes contain copper.

8 Claims, 2 Drawing Sheets

MULTI-LAYER CERAMIC CAPACITOR

BACKGROUND OF THE INVENTION

This invention generally relates to multi-layer ceramic capacitors, and particularly relates to multi-layer ceramic capacitors having high specific resistivities and low dielectric losses at high frequencies, and including inexpensive electrodes.

Recently, multi-layer ceramic capacitors are widely used to meet need of small-sized and large-capacitance capacitors. Conventional electrolytic capacitors generally have large capacitances, but can not operate normally at high frequencies. The multi-layer ceramic capacitors also have large capacitances and can operate normally at high frequencies. Therefore, in high-frequency circuits, multi-layer ceramic capacitors are used at points where large capacitances are necessary. In general, multi-layer ceramic capacitors are produced by a step of co-firing internal electrodes and dielectric ceramics. Ceramic capacitors of the high dielectric constant type conventionally include barium titanate ($BaTiO_3$) based material. Since the firing temperature of this material is high, e.g., about 1300° C., internal electrodes of the capacitors should be made of metals such as platinum (Pt) and palladium (Pd) which are expensive.

Proposed multi-layer ceramic capacitors use $BaTiO_3$ based material able to be fired in atmosphere or ambient gas of low partial pressure of oxygen and have internal electrodes made of base metal such as nickel (Ni).

U.S. Pat. No. 3,920,781 discloses a method of manufacturing a multi-layer ceramic capacitor which uses acceptor dopant $BaTiO_3$ based dielectric material and which has internal electrodes made of a base metal such as nickel (Ni), cobalt (Co), or iron (Fe).

U.S. Pat. No. 4,115,493 discloses a multi-layer ceramic capacitor which uses dielectric material made by doping or adding calcium (Ca) to $BaTiO_3$ based material. In this case, the ratio A/B is chosen to be 1.005-1.03 where the letter A denotes the sum of the mol ratios of Ba and Ca while the letter B denotes the sum of the mol ratios of the other cations. In addition, this multi-layer ceramic capacitor has internal electrodes made of nickel.

In the known multi-layer ceramic capacitors, since dielectric material consists of $BaTiO_3$ based material whose firing temperature is higher than the melting point of copper (Cu), base metal such as nickel (Ni) is used as internal electrodes in place of copper. The electrical conductivity of base metal such as nickel (Ni) is lower than that of copper (Cu), silver (Ag), and platinum (Pt). Internal electrodes made of base metal such as nickel (Ni) increase loss factors of related capacitors at high frequencies. Base metal such as nickel has low equilibrium oxygen partial pressure which can be disadvantageous as follows. When dielectric ceramics are fired together with internal electrodes made of base metal such as nickel, the dielectric ceramics are exposed to the equilibrium oxygen partial pressure of the base metal at the firing temperature so that the dielectric ceramics tend to be reduced and to have low resistivities.

SUMMARY OF THE INVENTION

It is an object of this invention to provide a multi-layer ceramic capacitor which has a high specific resistivity, and a low loss factor at high frequencies, and which has inexpensive electrodes.

In accordance with this invention, a multi-layer ceramic capacitor includes dielectric ceramics extending between internal electrode layers. The dielectric ceramics include an oxide containing a component A and a component B. The component A is selected from a group I of lead (Pb), calcium (Ca), strontium (Sr), and barium (Ba). The component B is selected from a group II of magnesium (Mg), nickel (Ni), titanium (Ti), zinc (Zn), niobium (Nb), and tungsten (W). The component A includes lead and at least one of the other substances in the group I. The component B includes at least two of the substances in the group II. A ratio between values a and b is chosen so that $a/b > 1.00$, where the value a denotes the total mol value of the substances in the component A and the value b denotes the total mol value of the substances in the component B. The internal electrode layers are made of copper or an alloy including copper as a principal component.

The lead based perovskites used as dielectric materials in the multi-layer ceramic capacitor of this invention have firing temperatures lower than the melting point of copper, and the dielectric material has high specific resistivity in a wide range of oxygen partial pressure centered at the equilibrium oxygen partial pressure of copper at the firing temperature. Accordingly, in the multi-layer ceramic capacitor including internal electrodes made of copper, the oxygen partial pressure can be controlled easily and a high specific resistivety can be reliably obtained.

Since the internal electrodes are at least principally made of copper which has a relatively high equilibrium oxygen partial pressure in comparion with other base metals, the dielectric ceramic tends not to be reduced during firing and tends not to have a low resistance. In addition, since the copper electrodes are highly conductive and non-magnetic, the copper electrodes do not cause an appreciable dielectric loss at high frequencies even when they are in the form of a plate. Furthermore, since copper is cheaper than palladium and platinum, inexpensive electrodes can be obtained.

DESCRIPTION OF THE PREFERRED EMBODIMENTS

EXAMPLE 1

Figure 1:
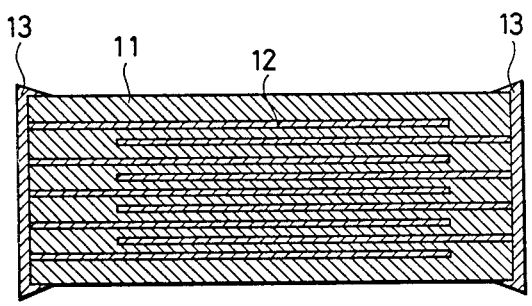
FIG. 1 is a sectional view of a multi-layer ceramic capacitor according to an embodiment of this invention.

Materials A, B, C, and D expressed by the following chemical formulas were used for ceramic dielectrics of multi-layer ceramic capacitors.

A:

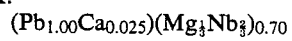

Ti$_{0.25}$(Ni$_\frac{1}{3}$W$_\frac{2}{3}$)$_{0.05}$O$_{3.025}$

B:
(Pb$_{1.00}$Ba$_{0.05}$)(Mg$_\frac{1}{3}$Nb$_\frac{2}{3}$)$_{0.40}$
Ti$_{0.30}$(Zn$_\frac{1}{3}$W$_\frac{2}{3}$)$_{0.30}$O$_{3.05}$ C:
(Pb$_{0.96}$Sr$_{0.07}$)(Ni$_\frac{1}{3}$Nb$_\frac{2}{3}$)$_{0.62}$
Ti$_{0.38}$O$_{3.03}$ D:
(Pb$_{1.05}$Ca$_{0.02}$Sr$_{0.01}$Ba$_{0.01}$)
Ti$_{0.275}$(Ni$_\frac{1}{3}$Nb$_\frac{2}{3}$)$_{0.70}$(Zn$_\frac{1}{3}$
W$_\frac{2}{3}$)$_{0.0025}$O$_{3.09}$ Dielectric powder was produced in a conventional way of manufacturing ceramics. The dielectric powder was calcinated at a temperature of 800° C. for two hours. The calcinated powder was mixed with acrylic resin and a solvent in a ball mill. The acrylic resin serves as binder. The mixing ratio or quantity of the acrylic binder was 7 weight percent (wt %) with respect to the quantity of the calcinated powder. The mixing ratio or quantity of the solvent was 50 wt % with respect to the quantity of the calcinated powder. The resulting mixture was formed by a doctor blade into a sheet having a thickness of 35 μm.

Materials E and F expressed by the following chemical formulas were used for inernal electrodes of the multi-layer ceramic capacitors.

E:
Cu

F:
Cu-5 wt % Ag

Electrodes made of the material F will be described below. Copper (Cu) metal powder and silver (Ag) metal powder both containing grains with diameters of 0.5–2.0 μm were mixed at a predetermined ratio. The resulting copper-silver metal powder was xixed by a three roll mill with acrylic resin and a solvent and was then formed into electrode paste. The acrylic resin serves as binder. The mixing ratio or quantity of the acrylic binder was 5 wt % with respect to quantity of the copper-silver metal powder. The mixing ratio or quantity of the solvent was 30 wt % with respect to quantity of the copper-silver metal powder.

Electrode paste was also prepared from the material E in a similar way.

A pattern of internal electrodes was printed on the dielectric sheet in a screen printing process by use of the electrode paste. The dielectric sheets having the printed internal electrode patterns were laminated in such a manner that the internal electrodes project alternaltely in opposite directions, e.g., project alternaltely leftward and rightward. Then, the laminated sheets were cut and formed into laminated chips.

Terminations or end electrodes were formed by applying the electrode paste to opposite end faces of the laminated chip from which the internal electrodes project.

In this way, a laminated body was produced which has dielectric sheets, internal electrodes, and end electrodes. The laminated body thus produced was placed on coarse zirconia within a ceramic boat, and then 1% O$_2$—N$_2$ gas (a mixture of 1% oxygen gas and 99% nitrogen gas) was supplied into the boat and the binder was burned out at a temperature of 350° C.

Figure 3:
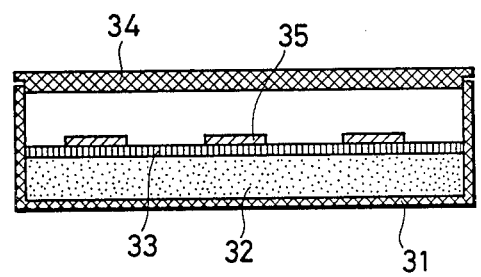
FIG. 3 is a sectional view of a magnesia ceramic container and its contents.
Figure 4:
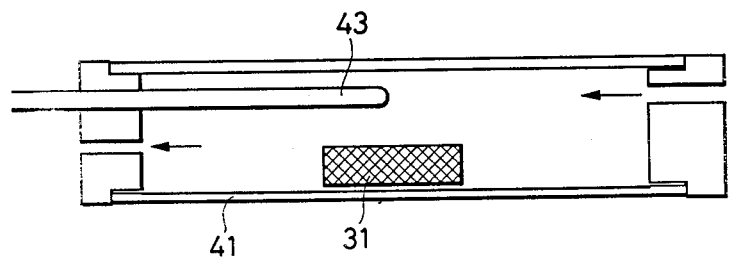
FIG. 4 is a sectional view of a tube furnace during firing.

FIG. 3 shows a magnesia ceramic container accommodating the laminated body during firing. FIG. 4 shows a furnace aluminum tube. As shown in FIG. 3, the previously-mentioned calcinated powder 32 was laid or placed flat on an inner bottom surface of a magnesia ceramic container 31. The volume of the calcinated power 32 was approximately one-third of the volume of the container 31. Zirconia powder (ZrO$_2$) 33 of 200 mesh was laid or placed flat on the layer of the calcinated powder 32. The thickness or depth of the layer of the zirconia powder 33 was approximately 1 mm. The burned-out laminated bodies 35 were placed on the zirconia powder layer 33. Then, the container 31 was closed by a magnesia ceramic lid 34. As shown in FIG. 4, the closed container 31 was inserted into an aluminum tube 41 in a furnace. After the aluminum tube 41 was evacuated, N$_2$—H$_2$ gas (a mixture of nitrogen gas and hydrogen gas) was continuously supplied into the aluminum tube 41. During the continuous supply of the mixture, the oxygen partial pressure within the aluminum tube 41 was monitored as will be described hereinafter, and the mixing ratio between the nitrogen gas and the hydrogen gas was adjusted so that the oxygen partial pressure within the aluminum tube 41 was regulated at a predetermined level. The aluminum tube 41 was exposed to the following temperature control while receiving the continuous supply of the gas mixture. First, the aluminum tube 41 was heated to a preset temperature at a rate of 400° C./hr. Second, the temperature of the aluminum tube 41 was maintained at this preset temperature for two hours. Third, the aluminum tube 41 was cooled at rate of 400° C./hr.

An yttrium oxide stabilized zirconia oxygen sensor 43 was previously inserted into the aluminum tube 41. This sensor includes a first platinum electrode exposed to atmosphere and a second platinum electrode exposed to the gas mixture within the aluminum tube 41. The oxygen partial pressure PO$_2$ within the aluminum tube 41 was derived from the voltage E(volt) between the electrodes of the sensor 43 by referring to the following equation.

$$PO_2 = 0.2 \cdot \exp(4FE/RT)$$

where the character F denotes a Faraday constant equal to 96,489 coulombs, the character R denotes a gas constant equal to 8.3144J/deg.mol, and the character T denotes the absolute temperature of the gas mixture or the aluminum tube 41.

The dimensions of the resulting laminated capacitor element were 2.8×1.4×0.9 mm. The effective electrode area per layer was 1.3125 mm$^2$ (1.75×0.75 mm). The thickness of the electrode layer was 2.0 μm. The thickness of the dielectric ceramic layer was 25 μm. The number of the effective dielectric ceramic layers was 30. Two non-electrode layers were provided at each of opposite ends of the laminated capacitor element.

Table 1 indicates various characteristics of twelve samples (denoted by the numerals 1–12) of multi-layer ceramic capacitors of this invention and indicates conditions during the productions of these samples. Specifically, Table 1 contains the compositions of the dielectric materials, the compositions of the electrodes, the firing temperatures, the oxygen partial pressures of the atmosphere or ambient gases during firing, the capacitances of the capacitors at a temperature of 20° C., the dielectric losses represented by tan δ of the capacitors at a temperature of 20° C., and the specific resistances or resistivities of the capacitors at a temperature of 20° C. The capacitances and the tan δ of the multi-layer ceramic capacitor elements were measured under conditions where an ac voltage having an amplitude of 1 volt and a frequency in the range of 100 Hz–2 MHz was applied across the capacitor elements. The specific resistances of the capacitor elements were derived from voltages across the capacitor elements which occurred at a moment one minute after the end of the application of a voltage of 50 volts to the capacitor elements.

high frequencies. This invention allows inexpensive copper to be used for electrodes.

EXAMPLE 2

Material expressed by the following chemical formula was used for ceramic dielectrics of a multi-layer ceramic capacitor.

TABLE 1

| No. | DIELECTRIC MATERIAL | ELECTRODE MATERIAL | FIRING TEMP. (°C.) | OXYGEN PARTIAL PRESSURE $PO_2$ (atm) | CAPACITANCE 20° C. 1 kHz (nF) | tan δ 20° C. ($\times 10^{-4}$) | | | | | | RESISTIVITY 20° C. (Ω) |
|---|---|---|---|---|---|---|---|---|---|---|---|---|
| | | | | | | 100 Hz | 1 kHz | 10 KHz | 100 kHz | 1 MHz | 2 MHz | |
| 1 | A | E | 980 | $1 \times 10^{-5}$ | 208 | 140 | 140 | 135 | 162 | 389 | 842 | $2.0 \times 10^{+11}$ |
| 2 | A | E | 980 | $4 \times 10^{-7}$ | 210 | 25 | 22 | 24 | 43 | 212 | 456 | $9.0 \times 10^{+11}$ |
| 3 | A | E | 1000 | $1 \times 10^{-10}$ | 203 | 33 | 31 | 34 | 56 | 285 | 455 | $3.5 \times 10^{+11}$ |
| 4 | B | F | 880 | $1 \times 10^{-5}$ | 88 | 102 | 100 | 101 | 124 | 312 | 658 | $1.5 \times 10^{+11}$ |
| 5 | B | F | 890 | $4 \times 10^{-7}$ | 89 | 46 | 50 | 50 | 64 | 308 | 514 | $2.2 \times 10^{+11}$ |
| 6 | B | F | 900 | $1 \times 10^{-10}$ | 88 | 62 | 60 | 62 | 74 | 325 | 689 | $1.0 \times 10^{+11}$ |
| 7 | C | E | 1000 | $4 \times 10^{-6}$ | 170 | 150 | 152 | 154 | 174 | 408 | 965 | $8.0 \times 10^{+10}$ |
| 8 | C | E | 1030 | $1 \times 10^{-8}$ | 179 | 59 | 59 | 59 | 71 | 248 | 652 | $1.0 \times 10^{+11}$ |
| 9 | C | E | 1060 | $1 \times 10^{-10}$ | 172 | 125 | 120 | 128 | 142 | 287 | 741 | $3.5 \times 10^{+10}$ |
| 10 | D | F | 840 | $4 \times 10^{-6}$ | 203 | 144 | 140 | 144 | 168 | 358 | 962 | $1.5 \times 10^{+10}$ |
| 11 | D | F | 850 | $1 \times 10^{-8}$ | 208 | 66 | 70 | 70 | 102 | 216 | 489 | $4.0 \times 10^{+11}$ |
| 12 | D | F | 870 | $1 \times 10^{-10}$ | 201 | 101 | 106 | 105 | 135 | 368 | 664 | $7.0 \times 10^{+10}$ |

FIG. 1 shows a multi-layer ceramic capacitor of this invention. As shown in FIG. 1, the capacitor includes dielectric ceramic layers 11 and internal electrode layers 12 extending between the dielectric ceramic layers 11. The internal electrode layers 12 are made of copper or an alloy principally containing copper. The internal electrode layers 12 are alternately connected to one end electrode (termination) 13 and the other end electrode (termination) 13. The two terminations or end electrodes 13 are fixed to opposite faces of a laminated body of the capacitor. The end electrodes 13 are also made of copper or an alloy principally containing copper.

In a multi-layer ceramic capacitor of this invention, ceramic dielectric indludes an oxide containing a component A and a component B. The component A is selected from a group I of lead, calcium, strontium, and barium. The component B is selected from a group II of magnesium, nickel, titanium, zinc, niobium, and tungsten. The component A includes lead and at least one of the other substances in the group I. The component B includes at least two of the substances in the group II. A ratio between values a and b is chosen so that a/b > 1.00, where the value a denotes the total mol value of the substances in the component A and the value b denotes the total mol value of the substances in the component B. These ceramic dielectrics have high resistivities in a wide range of oxygen partial pressure around the equilibrium oxygen partial pressure of copper at the ceramic firing temperature. Accordingly, it is proper to co-fire these ceramic dielectric materials, internal electrodes and end electrodes made of copper or an alloy principally containing copper. If electrodes, especially internal electrodes, are made of base metal other than copper or other than an alloy principally containing copper, the equiliburium oxygen partial pressure of this metal might be low at the firing temperature of the ceramic dielectrics in this invention so that the ceramic dielectrics could be reduced or the electrodes could be oxidized. In this invention, the combination of the dielectric ceramic compositions and the electrode compositions consisting of copper or an alloy principally containing copper enables a high resistivity of the resulting capacitor and also a low dielectric loss of the resulting capacitor at

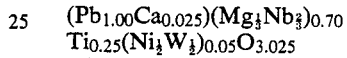

$(Pb_{1.00}Ca_{0.025})(Mg_{\frac{1}{3}}Nb_{\frac{2}{3}})_{0.70}$
$Ti_{0.25}(Ni_{\frac{1}{2}}W_{\frac{1}{2}})_{0.05}O_{3.025}$ Dielectric powder was produced in a conventional ceramic manufacturing method. The dielectric powder was calcinated at a temperature of 800° C. for two hours. The calcinated powder obtainned through grinding process was mixed with polyvinyl butyral resin and solvent in a ball mill. The polyvinyl butyral resin serves as binder. The mixing ratio or quantity of the polyvinyl butyral resin was 5 wt % with respect to the quantity of the calcinated powder. The mixing ratio or quantity of the solvent was 50 wt % with respect to the quantity of the calcinated powder. The resulting mixture was formed by a doctor blade into a sheet having a thickness of 35 μm.

Base material for internal electrodes contained copper oxide ($Cu_2O$) and the above-mentioned dielectric. The quantity of the dielectric was 20 wt % with respect to the quantity of the copper oxide. The base material powder was mixed by a three roll mill with ethyl cellulose and solvent, and was formed into electrode paste. The mixing ratio or quantity of the ethyl cellulose was 0.5 wt % with respect to the quantity of the copper oxide. The mixing ratio or quantity of the solvent was 25 wt % with respect to the quantity of the copper oxide. A pattern of internal electrodes were printed on the dielectric green sheet in a screen printing method by use of the electrode paste. The dielectric green sheets with the internal electrodes were laminated in such a manner that the electrodes projected alternaltely in opposite directions. Then, the laminated sheets were cut and formed into laminated chips.

Base material for terminations or end electrodes consisted of a mixture of copper oxide ($Cu_2O$) powder and inorganic oxide powder chosen such that after firing process, the volume ratio between these two components equals a predetermined value. The base material was mixed by a three roll mill with ethyl cellulose, butoxyethoxy ethyl acetate, and butyl acetate. The mixing ratio or quantity of the ethyl cellulose was 1.0 wt % with respect to the quantity of the base material or the copper oxide. The mixing ratio or quantity of the butoxyethoxy ethyl acetate was 25 wt % with respect to the quantity of the base material or the copper oxide. The mixing ratio or quantity of the buthyl acetate was 10 wt % with respect to the quantity of the base material or the copper oxide. The resulting mixture formed end electrode paste. Two kinds of end electrode paste were prepared for each sample of a capacitor by using base materials having different ratios between copper oxide powder and inorganic oxide powder. First end electrode paste causes the content or quantity of the metal oxide to be 5-50 volume percent after firing process. Second end electrode paste causes the content or quantity of the metal oxide to be 5 volume percent or less after firing process. End faces of the laminated chip from which the internal electrodes projected were immersed in the first end electrode paste. After the laminated chip was separated from the first end electrode paste, the laminated chip was dried. Then, the end faces of the laminated chip to which the first end electrode paste was applied were immersed in the second end electrode paste. After the laminated chip was separated from the second end electrode paste, the laminated chip was dried. In this way, a laminated body provided with electrodes was produced.

Coarse zirconia was laid or placed flat on an inner bottom surface of a ceramic boat. The laminated body was placed on the coarse zirconia layer, and the binder was burned out in air at a temperature of 450° C.

Figure 5:
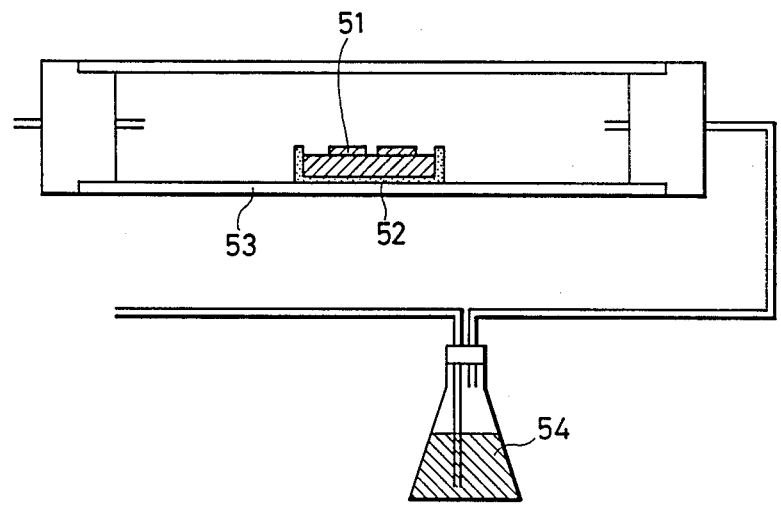
FIG. 5 is a sectional view of a tube furance and gas pipes during reduction of electrodes.

As shown in FIG. 5, the ceramic boat 52 carrying the burned-out laminated bodies 51 were placed within a furnace aluminum tube 53 having an inside diameter of 50 mm. Nitrogen gas, which was bubbled through 3 wt % ammonia water 54 having a temperature of 20° C., was continuously passed through the aluminum tube 53 at a rate of one liter per minute. The aluminum tube 53 was continuously heated at a temperature of 500° C. for eight hours while receiving the continuous nitrogen gas supply, so that the copper oxide of the internal electrodes and the end electrodes was reduced to form metal copper.

The previously-mentioned calcinated powder was laid or placed flat on an inner bottom surface of a magnesia ceramic container, as in Example 1 (see FIG. 3). The volume of the calcinated powder was approximately one-third of the volume of the container. Zirconia powder of 200 mesh was laid or placed flat on the layer of the calcinated powder, as in Example 1 (see FIG. 3). The thickness or depth of the layer of the zirconia powder was approximately 1 mm. The burned-out laminated bodies were placed on the zirconia powder layer, as in Example 1 (see FIG. 3). Then, the container was closed by a magnesia ceramic lid, as in Example 1 (see FIG. 3). The closed container was inserted into an aluminum tube in a furnace, as in Example 1 (see FIG. 4). After the aluminum tube was evacuated, $N_2$-$H_2$ gas (a mixture of nitrogen gas and hydrogen gas) was continuously supplied into the aluminum tube. During the continuous supply of the gas mixture, the oxygen partial pressure within the aluminum tube was monitored, and the mixing ratio between the nitrogen gas and the hydrogen gas was adjusted so that the oxygen partial pressure within the aluminum tube was regulated at a predetermined level, as in Example 1. The aluminum tube was exposed to the following temperature control while receiving the continuous supply of the gas mixture. First, the aluminum tube was heated to a temperature of 980° C. at a rate of 400° C./hr. Second, the temperature of the aluminum tube was maintained at this temperature for two hours. Third, the aluminum tube was cooled at a rate of 400° C./hr.

An yttrium oxide stabilized zirconia oxygen sensor was previously inseted into the aluminum tube, as in Example 1 (see FIG. 4). This sensor includes a first platinum electrode exposed to atmosphere and a second platinum electrode exposed to the gas mixture within the aluminum tube. The oxygen partial pressure $PO_2$ within the aluminum tube was derived from the voltage E(volt) between the electrodes of the sensor by referring to the following equation, as in Example 1.

$$PO_2 = 0.2.\exp(4FE/RT)$$

where the character F denotes a Faraday constant equal to 96,489 coulombs, the character R denotes a gas constant equal to 8.3144J/deg.mol, and the character T denotes the absolute temperature of the gas mixture or the aluminum tube.

The dimensions of the resulting laminated capacitor element were $2.8 \times 1.4 \times 0.9$ mm. The effective electrode area per layer was 1.3125 mm$^2$ ($1.75 \times 0.75$ mm). The thickness of the electrode layer was 2.0 μm. The thickness of the dielectric ceramic layer was 25.0 μm. The number of effective dielectric ceramic layers was 30. Two non-electrode layers were provided at each of opposite ends of the laminated capacitor element. At central portions of end faces of the capacitor element, the end electrodes had a thickness of 80 μm. Near a depth of 40 μm, the end electrodes had a boundary between two layers. The end electrodes extended over the side faces of the capacitor element for a distance of 0.4 mm.

Table 2 indicates various characteristics of thirteen samples (denoted by the numerals 1-13) of multi-layer ceramic capacitors related and unrelated to this invention. The samples denoted by the numerals without the character * relate to this invention. The samples denoted by the numerals with the character * unrelate to this invention and are references for the comparison with the capacitors of this invention. Specifically, Table 2 contains the compositions of the end electrode inner layers contacting the capacitor element end faces, the compositions of the end electrode outer layers, the capacitances of the sample capacitors at a temperature of 20° C., the dielectric losses represented by the tan δ of the sample capacitors at a temperature of 20° C., the specific resistances or resistivities of the sample capacitors at a temperature of 20° C., the bonding strength of the end electrodes, and the brake points of the sample capacitors. Table 3 indicates the details of the compositions of the end electrode layers. The capacitances

TABLE 2

| No. | END ELECTRODE INNER LAYER | END ELECTRODE OUTER LAYER | CAPACITANCE 20° C. nF | tan δ 20° C. $\times 10^{-4}$ | RESISTIVITY 20° C. | BONDING STRENGTH (Kg) | BRAKE POINT |
|---|---|---|---|---|---|---|---|
| 1* | A | F | 32 | 168 | $1 \times 10^{+12}$ | 0.46 | X |
| 2 | B | F | 196 | 102 | $5 \times 10^{+11}$ | 0.78 | Y |
| 3 | C | G | 199 | 38 | $5 \times 10^{+11}$ | 0.91 | X-Y |
| 4 | D | G | 194 | 39 | $5 \times 10^{+11}$ | 0.78 | X-Y |
| 5* | E | G | 199 | 41 | $4 \times 10^{+11}$ | 0.54 | X-Y |

TABLE 2-continued

| No. | END ELECTRODE INNER LAYER | END ELECTRODE OUTER LAYER | CAPACITANCE 20° C. nF | tan δ 20° C. × $10^{-4}$ | RESISTIVITY 20° C. | BONDING STRENGTH (Kg) | BRAKE POINT |
|---|---|---|---|---|---|---|---|
| 6* | C | D | 185 | 148 | $5 \times 10^{+11}$ | | |
| 7 | C | E | 196 | 58 | $5 \times 10^{+11}$ | 0.61 | X-Z |
| 8 | C | F | 199 | 40 | $5 \times 10^{+11}$ | 0.74 | X-Y |
| 9 | H | J | 199 | 61 | $2 \times 10^{+11}$ | 0.69 | X-Y |
| 10 | I | K | 194 | 60 | $1 \times 10^{+11}$ | 0.77 | X-Y |
| 11 | L | M | 192 | 67 | $6 \times 10^{+11}$ | 0.91 | Y |
| 12* | C | C | 184 | 85 | $5 \times 10^{+11}$ | | |
| 13* | G | G | | | | | |

TABLE 3

| No. | METAL VOL % | METAL COMPOSITION | INORGANIC OXIDE VOL % | INORGANIC OXIDE COMPOSITION |
|---|---|---|---|---|
| A | 30 | Cu | 70 | $(Pb_{1.0}Ca_{0.025})(Mg_{\frac{1}{3}}Nb_{\frac{2}{3}})_{0.7}Ti_{0.25}(Ni_{\frac{1}{2}}W_{\frac{1}{2}})_{0.05}O_{3.025}$ |
| B | 50 | Cu | 50 | SAME AS A |
| C | 70 | Cu | 30 | SAME AS A |
| D | 90 | Cu | 10 | SAME AS A |
| E | 95 | Cu | 5 | SAME AS A |
| F | 98 | Cu | 2 | SAME AS A |
| G | 100 | Cu | 0 | SAME AS A |
| H | 70 | Cu | 30 | $(Pb_{1.0}Ba_{0.025})(Mg_{\frac{1}{3}}Nb_{\frac{2}{3}})_{0.8}Ti_{0.15}(Zn_{\frac{1}{2}}W_{\frac{1}{2}})_{0.05}O_{3.025}$ |
| I | 70 | Cu | 30 | $(Pb_{1.0}Sr_{0.025})(Mg_{\frac{1}{3}}Nb_{\frac{2}{3}})_{0.7}Ti_{0.20}(Mg_{\frac{1}{2}}W_{\frac{1}{2}})_{0.10}O_{3.025}$ |
| J | 100 | Cu—5% Ni | 0 | SAME AS A |
| K | 100 | Cu—5% Ag | 0 | SAME AS A |
| L | 70 | Cu | 30 | COMPOSITION A 95 wt % + $B_2O_3$ 5 wt % |
| M | 97 | Cu | 3 | COMPOSITION A 80 wt % + $B_2O_3$ 20 wt % | and the tan δ of the multi-layer ceramic capacitor elements were measured under conditions where an ac voltage having an amplitude of 1 volt and a frequency of 1 KHz was applied across the capacitor elements. The specific resistivities of the capscitor elements were derived from voltages across the capacitor elements which occurred at a moment one minute after the end of the application of a voltage of 50 volts to the capacitor elements.

In the column of the brake point of Table 2: the character X represents the inside of the end electrode; the character Y represents the inside of the capacitor element main body; the character X-Y represents the connection between the end electrode and the capacitor element main body; and the character X-Z represents the connection between the end electrode and the solder. It should be noted that the samples 6 and 12 could not be soldered. Furthermore, in the sample 13 the end electrodes could not be bonded to the capacitor body.

Figure 6:
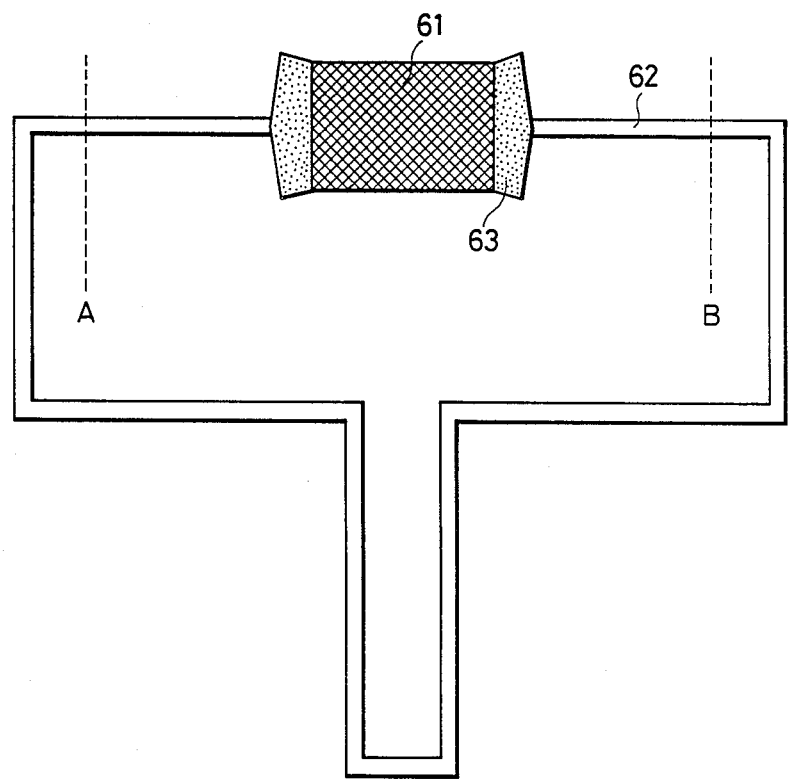
FIG. 6 is a diagram of a capacitor main body, end electrodes, and nickel coated wires which will be exposed to a test for the strength of soldered connections.

As shown in FIG. 6, after firing, the multi-layer ceramic capacitor element 61 was held between a nickel coated wire 62 of 0.45 mm-diameter in such a manner that ends of the wire 62 contact the end electrodes of the capacitor element 61 respectively. Then, the combination of the capacitor element 61 and the wire 62 was immersed in melted solder in a vessel having a temperature of 260° C. After the combination of the capacitor element 61 and the wire 62 was separated from the solder vessel, the wire 62 was cut at points A and B of FIG. 6. In this way, a pair of opposite nickel coated wires soldered to the end electrodes were obtained. The bonding strength of the connection between the end electrode and the capacitor main body, the bonding strength of the connection between the end electrode and the solder 63, and the brake point were detected and minotored while the wires were pulled in opposite directions.

Figure 2:
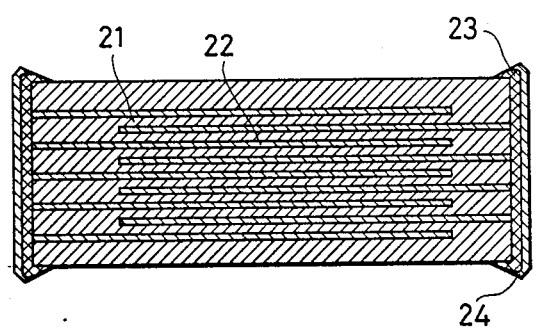
FIG. 2 is a sectional view of a multi-layer ceramic capacitor according to another embodiment of this invention.

FIG. 2 shows a multi-layer ceramic capacitor of this invention. As shown in FIG. 2, the capacitor includes dielectric ceramic layers 21 and internal electrode layers 22 extending between the dielectric ceramic layers 21. The internal electrode layers 22 are made of copper or an alloy principally containing copper. Each of two terminations or end electrodes includes an inner layer 23 and an outer layer 24. The end electrode inner layers 23 directly contact opposite faces of the laminated body of the capacitor. The end electrode outer layers 24 extend over the inner layers 23 and are exposed. The internal electrode layers 22 are alternately connected to one end electrode inner layer 23 and the other end electrode inner layer 23.

In this invention, the inorganic oxide content is limited or restricted in a predetermined range for the following reasons. If the inorganic oxide content of the end electrode contacting the face of the capacitor laminated body, that is, the inorganic oxide content of the end electrode inner layer, exceeds 50 volume percent, the electrical connection between the internal electrodes and the end electrode might be impaired and the electrical resistance of the end electrode would be increased. The connection impairment and the resistance increase would reduce the capacitance of the capacitor and increase the dielectric loss in the capacitor. If the inorganic oxide content of the end electrode contacting the face of the capacitor laminated body, that is, the inorganic oxide content of the end electrode inner layer, is smaller than 5 volume percent, the bonding strength of the connection between the capacitor body and the end electrode would be decreased. If the inorganic oxide content of the end electrode exposed outer layer exceeds 5 volume percent, the bonding strength of the connection between the end electrode and the solder would be reduced. The inorganic oxide concentrations defined in this invention can prevent such problems.

When the capacitor element is immersed in melted solder, the two-layer structure of the end electrode prevents or reduces a phenomenon that the end electrode melts and diffuses into the solder and finally disappears. The two-layer structure enalbes an adequate bonding strength of the connection between the solder and the end electrode, and also an adequate bonding strength of the connection between the capacitor element and the end electrode.

What is claimed is:

1. A multi-layer ceramic capacitor comprising:
   (a) internal electrode layers; and
   (b) ceramic dielectric layers extending between the internal electrode layers;
   the ceramic dielectric layers consisting of low temperature sintering ceramic without glass phase the dielectric layers including an oxide containing a component A and a component B, the component A being selected from a group I of lead, calcium, strontium, and barium, the component B being selected from a group II of magnesium, nickel, titanium, zinc, niobium, and tungsten, the component A including lead and at least one of the other substance in the group I, the component B including at least two of the substances in the group II, a ratio between values a and b being chosen so that $a/b > 1.00$, where the vlaue a denotes a total mol value of the substances in the components A and the value b denotes a total mol value of the substances in the component B the sintering temperature of the ceramic being below 1080° C.;
   the internal electrode layers containing at least copper.

2. The capacitor of claim 1 wherein the internal electrode layers essentially consist of copper.

3. The capacitor of claim 1 wherein the internal electrode layers consist of an alloy principally containing copper.

4. The capacitor of claim 1 further comprising an end electrode directly connected to a preset number of the internal electrode layers and containing at least copper.

5. The capacitor of claim 4 wherein the end electrode essentially consists of copper.

6. The capacitor of claim 4 wherein the end electrode consist of an alloy principally containing copper.

7. A multi-layer ceramic capacitor comprising:
   (a) internal electrode layers; and
   (b) ceramic dielectric layers extending between the internal electrode layers; and
   (c) an end electrode directly connected to a predetermined number of the internal electrode layers and containing at least copper,
   the ceramic dielectric layers including an oxide containing a component A and a component B, the component A being selected from a group I of lead, calcium, strontium, and barium, the component B being selected from a group II of magnesium, nickel, titanium, zinc, niobium, and tungsten, the component A including lead and at least one of the other substances in the group I, the component B including at least two of the substances in the group II, a ratio between values a and b being chosen so that $a/b > 1.00$, where the value a denotes a total mol value of the substances in the components A and the value b denotes a total mol value of the substances in the component B;
   the internal electrode layers containing at least copper; the end electrode including an inner layer and an outer layer, the inner layer being directly connected to the preset number of the internal electrode layers, the outer layer extending over the inner layer, the inner layer including an inorganic oxide containing a component X1 and a component Y1, the component X1 being selected from the Group I, the component Y1 being selected from the group II, an inorganic oxide content of the inner layer being between 4 volume percent and 50 volume percent inclusive, the outer layer including an inorganic oxide containing a component X2 and a component Y2, the component X2 being selected from the group I, the component Y2 being selected from the group II, an inorganic oxide content of the outer layer being equal to or less than 45 volume percent.

8. A multi-layer ceramic capacitor comprising:
   (a) internal electrode layers; and
   (b) ceramic dielectric layers extending between the internal electrode layers;
   the ceramic dielectric layers including an oxide containing a component A and a component B, the component A being selected from a group I of lead, calcium, strontium, and barium, the component B being selected from a group II of magnesium, nickel, titanium, zinc niobium, and tungsten, the component a including lead and at least one of the other substances in the group I, the component B including at least two of the substances in the group II, a ratio between values a and b being chosen so that $a/b > 1.00$, where the value a denotes a total mol value of the substance in the component A and the value b denotes a total mol value of the substances in the component B;
   the internal electrode layers containing at least copper;
   the component B including at least one of nickel and zinc.

* * * * *